(12) United States Patent
Jones

(10) Patent No.: US 8,782,945 B2
(45) Date of Patent: *Jul. 22, 2014

(54) FISHING LURE

(76) Inventor: Charles Frederick Jones, Duncan (CA)

( * ) Notice: Subject to any disclaimer, the term of this patent is extended or adjusted under 35 U.S.C. 154(b) by 453 days.

This patent is subject to a terminal disclaimer.

(21) Appl. No.: 13/086,656

(22) Filed: Apr. 14, 2011

(65) Prior Publication Data
US 2012/0186135 A1 Jul. 26, 2012

(30) Foreign Application Priority Data
Jan. 26, 2011 (CA) .................................. 2729671

(51) Int. Cl.
A01K 85/14 (2006.01)

(52) U.S. Cl.
USPC .......................................................... 43/42.5

(58) Field of Classification Search
USPC ..................................... 43/42.5, 42.51, 42.52
See application file for complete search history.

(56) References Cited

U.S. PATENT DOCUMENTS

| 261,194 | A | * | 7/1882 | Wylly | 43/42.51 |
|---|---|---|---|---|---|
| 570,687 | A | * | 11/1896 | Stanley | 43/42.51 |
| 632,554 | A | * | 9/1899 | Dukes | 43/42.51 |
| 770,858 | A | * | 9/1904 | Hornung | 43/42.51 |
| 804,206 | A | * | 11/1905 | Bruton | 43/42.51 |
| 1,303,467 | A | * | 5/1919 | Ettershank | 43/42.51 |
| 1,566,059 | A | * | 12/1925 | Willson | 43/42.51 |
| 1,692,674 | A | * | 11/1928 | Mapel | 43/42.5 |
| 1,742,934 | A | * | 1/1930 | Richardson | 43/42.5 |
| 1,809,663 | A | * | 6/1931 | Allen | 43/42.5 |
| 1,831,267 | A | * | 11/1931 | Schwarz | 43/42.51 |
| 1,852,620 | A | * | 4/1932 | Martin | 43/42.5 |
| 1,938,653 | A | * | 12/1933 | Bardon | 43/42.5 |
| 1,991,142 | A | * | 2/1935 | Eggleston | 43/42.51 |
| 1,997,802 | A | * | 4/1935 | Meyer | 43/42.52 |
| 2,001,055 | A | * | 5/1935 | DeWitt | 43/42.51 |
| 2,017,486 | A | * | 10/1935 | Chester | 43/42.51 |
| 2,058,121 | A | * | 10/1936 | Allen | 43/42.5 |
| 2,214,266 | A | * | 9/1940 | Haury | 43/42.52 |
| 2,236,023 | A | * | 3/1941 | Turner | 43/42.51 |
| 2,244,378 | A | * | 6/1941 | Turner | 43/42.14 |
| 2,256,346 | A | * | 9/1941 | Mathie | 43/42.52 |
| 2,280,197 | A | * | 4/1942 | Ounsworth | 43/42.52 |
| 2,315,307 | A | * | 3/1943 | Wilson | 43/42.5 |

(Continued)

FOREIGN PATENT DOCUMENTS

| CA | 986306 | 3/1976 |
|---|---|---|
| CA | 1191682 | 8/1985 |

(Continued)

Primary Examiner — Darren W Ark
(74) Attorney, Agent, or Firm — Sander R. Gelsing

(57) ABSTRACT

A fishing lure manufactured from polycarbonate thermoplastic resin, which is lightweight, durable and economical, with high tensile strength but some flex. The lure mimics the appearance and action of an injured needlefish. The front portion is planar but the rear portion is curved, the curve characterized by a transverse bend and a slight twist about the longitudinal axis. The lure is precisely balanced so that, when pulled through the water, the twist causes the lure to roll x times clockwise, winding up the leader, whereupon the bend and the weight of the lure cause the leader to unwind then wind up counter-clockwise, so that the lure rolls counter-clockwise, settling into a reverse roll action of 2× rolls in one direction, then 2× rolls in the opposite direction, repeated indefinitely. This realistic action induces game fish to strike in a reaction bite.

20 Claims, 2 Drawing Sheets

(56) References Cited

U.S. PATENT DOCUMENTS

| | | | | |
|---|---|---|---|---|
| 2,608,787 | A * | 9/1952 | Krogue | 43/42.51 |
| 2,665,516 | A * | 1/1954 | Race | 43/42.51 |
| 2,667,007 | A * | 1/1954 | Heron | 43/42.5 |
| 2,680,320 | A * | 6/1954 | Rothbard | 43/42.5 |
| 2,736,982 | A * | 3/1956 | Curtis | 43/42.51 |
| 2,765,570 | A * | 10/1956 | Sedivy | 43/42.5 |
| 2,778,145 | A * | 1/1957 | Momb | 43/42.51 |
| 2,805,512 | A * | 9/1957 | Bunce | 43/42.18 |
| 2,891,344 | A * | 6/1959 | Hottowe | 43/42.5 |
| 2,907,132 | A * | 10/1959 | Suorsa | 43/42.51 |
| D188,055 | S * | 5/1960 | Phillips | 43/42.51 |
| 2,945,317 | A * | 7/1960 | Wittmann, Jr. | 43/42.5 |
| 2,982,048 | A * | 5/1961 | McGarry et al. | 43/42.5 |
| 2,986,812 | A * | 6/1961 | Arter, Jr. et al. | 43/42.5 |
| 3,056,228 | A * | 10/1962 | Stackhouse | 43/42.51 |
| 3,145,497 | A * | 8/1964 | Aho | 43/42.5 |
| 3,197,910 | A * | 8/1965 | Colangelo | 43/42.5 |
| 3,264,775 | A * | 8/1966 | Nahigian | 43/42.5 |
| 3,403,469 | A * | 10/1968 | Whitney | 43/42.5 |
| 3,418,744 | A * | 12/1968 | Panicci | 43/42.5 |
| 3,656,253 | A * | 4/1972 | Gaunt | 43/42.51 |
| 3,673,727 | A * | 7/1972 | Bauer | 43/42.5 |
| 3,673,728 | A * | 7/1972 | Danbrova | 43/42.51 |
| 3,685,191 | A | 8/1972 | Metzger | |
| D228,553 | S * | 10/1973 | Sanderson | 43/42.5 |
| 3,881,271 | A * | 5/1975 | Jacura | 43/42.5 |
| 3,981,096 | A * | 9/1976 | Toivonen | 43/42.5 |
| 4,075,778 | A * | 2/1978 | Howard | 43/42.5 |
| 4,139,962 | A * | 2/1979 | Gardyszewski | 43/42.5 |
| 4,142,318 | A * | 3/1979 | Morrell | 43/42.5 |
| 4,174,584 | A * | 11/1979 | Howard | 43/42.5 |
| 4,201,006 | A * | 5/1980 | Wetherald | 43/42.51 |
| 4,471,557 | A * | 9/1984 | Gage | 43/42.5 |
| 4,475,302 | A * | 10/1984 | Jakeway | 43/42.5 |
| 4,479,323 | A * | 10/1984 | Burr | 43/42.5 |
| 4,501,087 | A * | 2/1985 | Blomquist | 43/42.51 |
| 4,610,103 | A | 9/1986 | Steinman | |
| 4,891,901 | A * | 1/1990 | Baker, Jr. | 43/42.11 |
| 5,367,816 | A * | 11/1994 | Gabos et al. | 43/42.5 |
| 6,108,964 | A | 8/2000 | Noorlander | |
| 6,161,325 | A * | 12/2000 | Moore | 43/42.5 |
| 6,301,823 | B1 * | 10/2001 | Monticello et al. | 43/42.5 |
| 6,457,275 | B1 | 10/2002 | Spurgeon | |
| 6,643,975 | B1 * | 11/2003 | Edwards | 43/42.51 |
| 7,216,456 | B2 * | 5/2007 | Kaariainen et al. | 43/42.5 |
| 7,610,713 | B1 * | 11/2009 | Eilers | 43/3 |
| 7,621,068 | B1 * | 11/2009 | Renosky | 43/42.5 |
| 7,627,978 | B2 * | 12/2009 | Davis | 43/42.5 |
| 8,245,437 | B1 * | 8/2012 | Yelton | 43/42.5 |
| 2002/0056222 | A1 * | 5/2002 | Andersen | 43/42.5 |
| 2005/0252069 | A1 * | 11/2005 | Pool et al. | 43/42.51 |
| 2009/0094879 | A1 * | 4/2009 | Beck | 43/42.51 |

FOREIGN PATENT DOCUMENTS

| | | | |
|---|---|---|---|
| CA | 1228985 | 11/1987 | |
| CA | 2047387 | 1/1993 | |
| CA | 2129209 | 3/1995 | |
| CA | 2369775 | 10/2000 | |
| CA | 2681472 | 9/2008 | |
| CA | 2599267 | 3/2009 | |
| CA | 2626707 | 3/2009 | |
| CA | 2637822 | 3/2009 | |
| CH | 679102 AS * | 12/1991 | A01K 85/14 |
| FR | 2566996 A1 * | 1/1986 | A01K 85/14 |
| GB | 2269517 A * | 2/1994 | A01K 85/14 |
| JP | 09070243 A * | 3/1997 | A01K 85/14 |

* cited by examiner

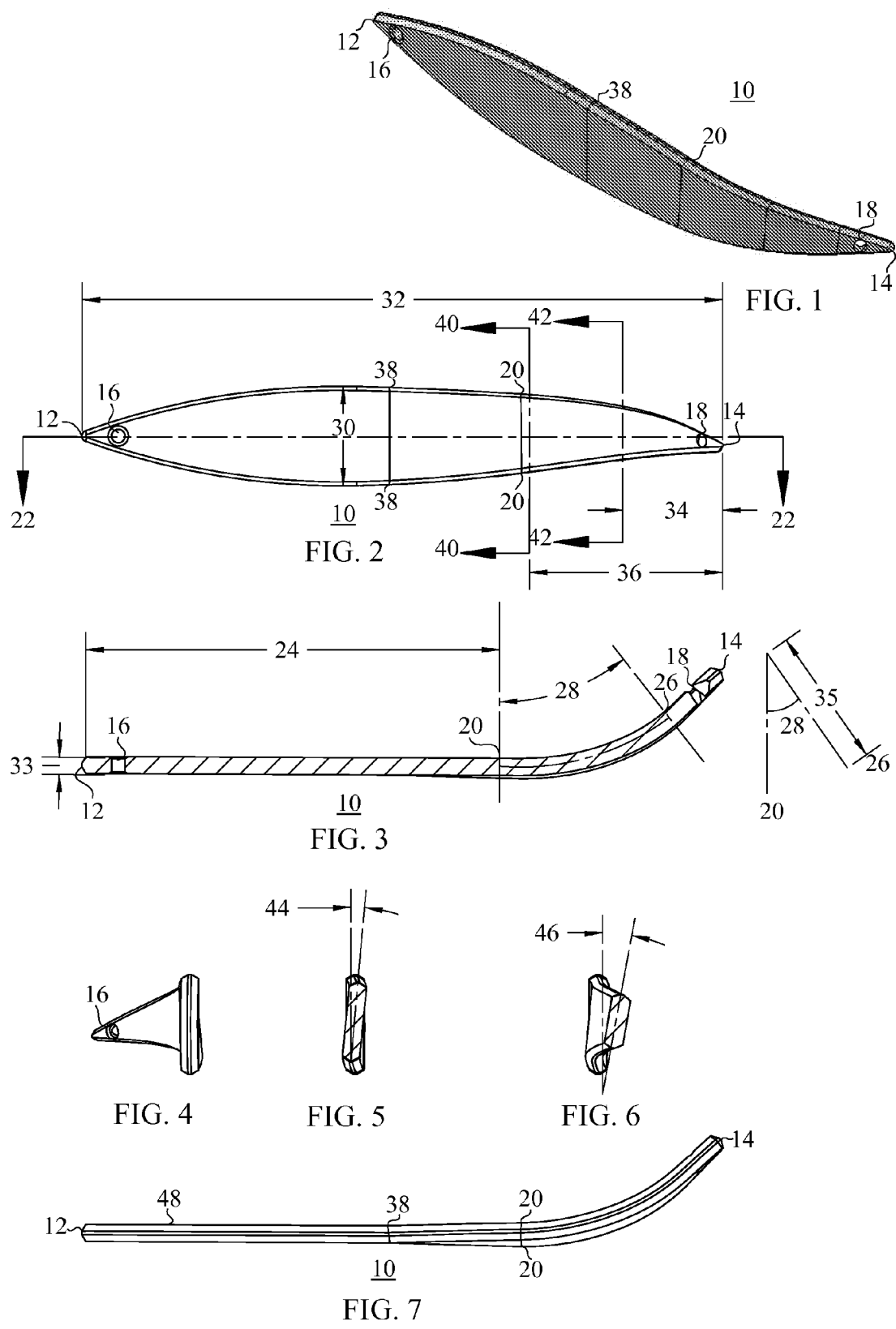

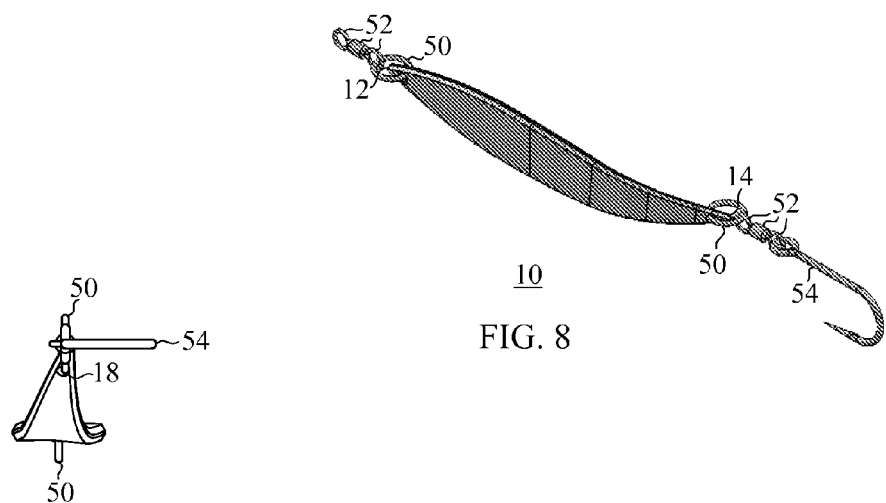
FIG. 8
FIG. 9
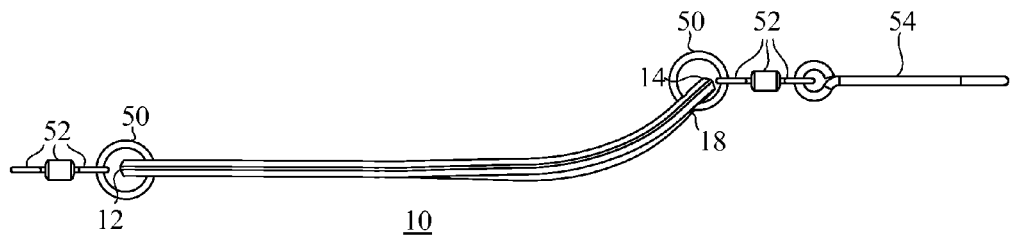
FIG. 10
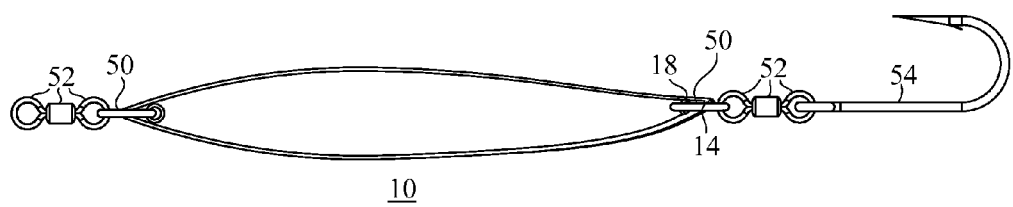
FIG. 11

FISHING LURE

RELATED APPLICATION

This Application claims priority from the Canadian Patent Application No. 2,729,671 filed on Jan. 26, 2011 and titled "FISHING LURE."

FIELD OF THE INVENTION

The present invention relates to fishing lures.

BACKGROUND OF THE INVENTION

For millennia, people have for fished for food and for trade. Sport fishing is a more recent development, but its popularity has increased exponentially over the last few centuries.

No doubt our ancestors fought over the best bone hook and shell lure. We have come a long way, but modern fishers still argue about the perfect lure. There can be no one answer: the best lure varies depending on equipment, technique, local conditions, species, and the prey each game fish expects to find in a specific season and locale. So fishing is both an art and a science, and its practitioners arrive on the scene with a tackle box full of lures of various shapes, sizes and colors. They are always searching for something better. If money is tight, sports fishers can rationalize the modest expense of a lure as it may pay for itself by catching dinner, and commercial fishers constantly need to replace lost and worn lures. So in any economic climate, the multi-billion dollar fishing equipment business remains strong and there is a constant demand for new products. Despite the almost fifteen hundred patents entitled "fishing lure" in the U.S. patent database alone, the search continues for the ultimate lure.

Why artificial lures? While fresh bait is effective if chosen correctly, it is also perishable, bulky and messy. Artificial lures are easy to store and carry, re-usable and convenient. Some artificial lures work best if used with fresh bait, such as U.S. Pat. No. 6,108,964 to Noorlander, but most fishers prefer one or the other.

There are a number of disadvantages to the lures of the prior art. For instance, lures may attract fish but not capture or hold them. Many lures of the prior art require the user to thread the leader in and around a series of openings, and the leader crosses the lure before it is tied to the hook with a specialized knot (a "Threaded Lure"). Examples include CA Pat. Appl. Nos. 2,637,822; 2,556,726; 2,626,707; and 2,599,267 to Jones (the "Early Jones Lures"); CA Pat. Appl. No. 2,047,387 and CA Pat. No. 986,306 to Gaunt (the "306 lure") and U.S. Pat. No. 3,685,191 to Metzger. Threading the lure is time-consuming, the leader may interfere with the action of the lure, and there is a good chance that a game fish caught on the hook will bite through the attached leader with its vicious teeth. If so, the fish, and maybe the lure, will be lost, and the hook may remain in the fish's mouth, condemning the fish to a lingering death. Some lures (i.e. Metzger's) have fixed hooks attached, which may bend and break, again allowing the fish to escape, perhaps with the hook fatally embedded in its mouth.

Threaded Lures usually cannot be used for spin-casting, another disadvantage. When the lure hits the water, the hook moves out of alignment and spoils the action. In fact, most lures designed for trolling, including the Early Jones Lures, are not suitable for spin-casting. Casting is popular with sports fishers who enjoy the challenge, cannot afford or do not want to maintain a boat, who suffer from sea-sickness, or who just like back-country hiking to remote lakes and streams. Examples of lures specifically for trolling include those described by Metzger, Gaunt, U.S. 2005/0252069 A1. to Pool & Spurgeon, U.S. Pat. No. 6,457,275 to Spurgeon, CA Pat. Appl. No. 2,681,472 to Smith & Smith and the Early Jones Lures.

Compared to flexible lures, fish are more likely to break free of the hooks of rigid lures such as those of Noorlander, Metzger, Pool & Spurgeon, Spurgeon, Smith & Smith, CA Pat. Appl. 1,228,985 to Jakeway, CA Pat. Appl. 1,191,682 to Gage, and CA Pat. Appl. 2,626,707 to Jones. Most rigid lures are metal, often subject to corrosion. However, many lures with some flex to them, such as the vintage plastic butyrate lures by Gaunt, may be more easily broken than metal lures. Lures with movable parts such as CA Pat. Appl. 2,369,775 to Knol are also at greater risk of breakage than one-piece lures.

For the sake of novelty, some lures become so complex that they are not economical, so are less likely to sell in large quantities. Examples include electric lures such as Spurgeon's which also have parts which may snap off.

Fish recognize their prey not only by sight, but also by using sensory receptors, usually on their lateral lines, to analyze vibrations that characterize the actions of specific bait fish. Game fish are more likely to strike at lures that look and move like their natural prey, but many lures in the prior art have no resemblance to any living creature. Others simply do not move naturally, such as Spurgeon's or Jakeway's. Many are designed to move in various ways which the inventors hope are reminiscent of swimming fish, such as Noorlanders, or preferably injured fish, such as Metzger's, Gaunt's, Knol's, Gage's and Batos & Lenek's, but fishers are still searching for an economical, durable, artificial lure that simulates the appearance and action of an injured bait fish to the fullest extent possible, and actually attracts and captures game fish. Not every action is attractive: some are unnatural and some frighten fish away. Some lures move so erratically or quickly that fish have trouble seizing them. The actions of prior art lures have not been self-perpetuating or dependable. Catches are often inconsistent, which is disappointing to sports fishers and devastating for guides and commercial fishers.

An injured fish often swims in a spiral, so rolling actions should often be attractive. However, lures of the prior art that roll primarily in one direction may eventually wind up the fishing line until it tangles. For that reason, few lures are purposefully designed to roll. Gaunt's 306 lure sometimes unwinds, but only randomly. Some lures that roll in only one direction include the patents to Metzger, Gage, CA Pat. No. 2,129,209 to Gabos & Olenek and one of the Early Jones Lures, CA Pat. Appl. No. 2.599,267. The other Early Jones Lures overcame the tangling disadvantage, but had other disadvantages.

The Early Jones Lures were Threaded Lures shaped like fish without fins or tails. They were concave on one side, convex on the other, arched in a single continuous curve from nose end to hook end. The belly was bigger than the back so the lure was asymmetrical. The leader-threading openings were at 45 to 60 degree angles to the concave and convex surfaces. This inventive combination resulted in a lure with a rolling action. The curve had two components, a transverse "bend" and a "twist" about the longitudinal axis. Depending on the material the lure was made from and the proportions, a specific degree of bend and twist was identified (within quite narrow parameters) that resulted in a reverse roll action described hereunder.

There were several disadvantages. None of the Early Jones Lures could be spin-cast and since they were all Threaded Lures, their fastening means were vulnerable to breakage. If the fastening means were changed, the balance and action of the lures changed, and they no longer had a reverse roll action. This problem took two years of experimentation to solve.

SUMMARY OF THE INVENTION

The more life-like the lure, generally the more fish are attracted. In particular, shape and action are important. An object of the invention is to produce a lure which attracts fish, then captures and holds them.

A manufacturer requested a life-like lure which is exceptionally economical, resists corrosion, is strong enough to hold a 50 or 60 pound fish, and has a fish-attracting action similar to the Early Jones Lures. The present invention meets these requirements and overcomes many of the disadvantages of the prior art.

The present invention is a fishing lure preferably made of plastic, and more preferably polycarbonate thermoplastic resin. The lure is shaped to simulate a fish without fins, and when it is pulled through the water, it resembles an injured bait fish. It has an elongated body with tapered ends and smooth side edges and is symmetrical about its central longitudinal axis. The front portion of the body is planar or flat and extends from a generally pointed nose for a distance of at least 45 percent of the length of the body. A rear portion ends in a generally pointed tail, and has a curve with two components: a slight twist of 5° to 8.5° about the longitudinal axis and a transverse bend of 32° to 44° beginning at a distance from the nose that is 58 to 67 percent of the total length of the body and extending towards the tail. A leader and a hook are attached to the lure adjacent to the nose and tail respectively, by fastening means centered on the longitudinal axis.

The object of keeping the fish on the hook is met in part by the improved fastening means, which preferably consist of (a) holes or openings drilled through the fishing lure, preferably at right angles, (b) attaching rings inserted through the openings, and (c) swivels attached to the rings. The leader is preferably attached to the swivel adjacent to the nose. The hook is attached to the swivel adjacent to the tail, so that the hook can rotate freely and trail the body as the lure is pulled through the water by the leader. This arrangement means the leader does not need to be threaded across the lure as in many lures of the prior art, minimizing the interference of the leader with the action of the lure, and disposing the leader away from the vicious teeth of game fish. This means the fish is less likely to bite through the leader and escape. Another advantage of these improved fastening means is that they allow the lure to be spin-cast.

The action of this lure is very attractive to game fish. The specific twist and bend and the balance of the lure cause the reverse roll action described hereunder, first seen in some of the Early Jones Lures and recreated and improved in the lure of the present invention. The longer, slimmer shape of the preferred embodiments leads to a tighter roll. This action simulates the movements of an injured bait fish, inducing a "reaction bite:" the game fish is stimulated to commit to reflexively strike the lure. The predictability of the action and tight rolls increase the likelihood that, having lunged for the lure, the fish will actually capture it, compared to lures with more erratic action. And finally, reverse rolls unwind the line as fast as it winds, so it will not tangle.

The greater length to width ratio of preferred embodiments also makes the lure look more like a needlefish. Game fish including salmon, halibut and ling cod which prey on needlefish, so there was a demand for a needlefish lure with a more realistic action than the needlefish lure of CA Pat. Appl. No. 2,637,822 to Jones, with less vulnerable fastening means, and that could be spin-cast, unlike the Early Jones Lures.

An object of the invention is to increase the strength of the lure while reducing weight and cost. Plastic lures are lightweight and inexpensive compared to metal lures, but usually not nearly as strong. In a preferred embodiment, the body is made of Lexan®, trade-marked by SABIC Innovative Plastics. Lexan® is a non-corrosive material that is inexpensive, lightweight and has some flex but retains its bend and is strong; the prior art has seldom taken advantage of this strength. See for example U.S. Pat. No. 4,610,103 to Steinman, where Lexan® plastic is chosen for its flexibility and transparency. When moulded from plastic the lure of the present invention can be produced quickly in large quantities, without compromising balance and precision, so a high quality lure will be available at a very low cost.

In preferred embodiments, the required strength of the present invention is achieved not only by using Lexan®, but also by slightly rounding the points of the nose and tail, and distancing the openings about a quarter inch from the rounded ends. A further improvement over the Early Jones Lures is to move the center of balance of the lure forward by locating the widest part (and more weight) closer to the nose, so heavier rings, swivels and hooks can be used in counterbalance without impairing the action, so larger fish can be caught than with comparably sized lures of the prior art. With this combination of inventive features, the lure should have the mechanical strength to withstand a large fighting game fish, and the seven inch version is suitable for commercial fishing.

Another object of the invention is to obtain the best possible action of the lure by decreasing the resistance to the free movement of rings in the openings by countersinking and slightly widening the openings.

The action of the lure is exceptionally attractive to Spring and Coho salmon and to other salt and fresh water game fish including bass and trout, and the way the lure is decorated adds to the attraction. Specific colors and flashes of light attract fish, so preferably the lure is painted to resemble bait fish and metallic reflective tape is applied. Salmon are attracted to a reflective eye and the color red, so in another preferred embodiment, a reflective eye is added on each side of the nose, and red gill slits are painted posterior to the eyes.

The specific, predictable and attractive action of the Early Jones Lures required precision balancing of twists, bends, proportions and weight distribution. Changing the fastening means, and/or the weight and shape to meet the needs of the industry threw off the action of the lure so it needed to be completely redesigned. The solutions to these needs embodied in the present invention required inventive ingenuity and two years of development and testing. The result has been a lure that is very successful at catching game fish.

With respect to the claims hereof, and before describing the drawings and at least one preferred embodiment of the invention in detail, it is to be understood that the invention is not to be limited in its application to the details of construction and to the arrangements of the components set forth herein. The invention is capable of being created in other embodiments. Also, it is to be understood that the phraseology and terminology employed here are for the purpose of description and should not be regarded as limiting.

BRIEF DESCRIPTION OF THE DRAWINGS

These and other features of the invention will become apparent from the following description of an embodiment in which reference is made to the appended drawings wherein:

FIG. 1 shows a perspective view of a body of a fishing lure according to the present invention, FIG. 2 shows a plan view of the body of the fishing lure according to the present invention, FIG. 3 shows a lengthwise cross-sectional view taken along line 22-22 of FIG. 2, FIG. 4 shows a transverse cross-sectional view taken along line 40-40 of FIG. 2, FIG. 5 shows another cross-sectional view taken along line 40-40 of FIG. 2, FIG. 6 shows a transverse cross-sectional view taken along line 42-42 of FIG. 1

FIG. 7 shows a top elevational view of the body of the fishing lure shown in FIGS. 1-6, FIG. 8 shows a perspective view of the body of the fishing lure of FIGS. 1-7 with the addition of rings, swivels and a hook, FIG. 9 shows a tail end elevational view of the fishing lure of FIG. 8, FIG. 10 shows a top elevational view of the body of the fishing lure of FIGS. 1-9 with the addition of rings, swivels, and a portion of the hook, and FIG. 11 shows a plan view of the fishing lure of FIG. 8.

Similar references are used in different figures to denote similar components.

DETAILED DESCRIPTION OF INVENTION

The following description is of a preferred embodiment illustrated in FIGS. 1-11 by way of example only, and without limitation to the combination of features necessary to carry the invention into effect. Specific dimensions and other physical characteristics related to the embodiments disclosed herein are not to be considered limiting unless otherwise indicated.

This embodiment relates to a fishing lure which, when pulled slowly through the water, has the appearance and action of an injured bait fish, preferably a needlefish.

FIG. 1 is a perspective view, illustrating an elongated body 10, tapering or decreasing in width towards the generally pointed nose 12 and tail 14. "Generally pointed" means pointed, but the point is then slightly rounded. The points at the nose 12 and tail 14 are rounded before the openings are drilled, to widen and strengthen the ends. Openings 16, 18 extend through the body 10 adjacent to the nose 12 and tail 14, preferably at right angles to the lateral surfaces.

Referring to FIG. 2, a plan view of the body 10 of the lure, and FIG. 3, a lengthwise cross-section 22-22 of FIG. 2, the body 10 is symmetrical about each side of a longitudinal axis (not shown) extending from nose 12 to tail 14. The openings 16, 18 are centered on the longitudinal axis. A latitudinal axis 38 is perpendicular to the longitudinal axis and in this embodiment, begins at a distance from the nose 12 that is approximately 50% of the length of the body 10. The body 10 has a planar front portion that extends from the nose 12 to the latitudinal axis 38. A curved rear portion extends from the latitudinal axis 38 and terminates in the tail 14.

The curve in the rear portion is a segment of a helix, formed by laying a cylindrical rod transversely across the body 10 at an oblique angle, and bending the body 10 partially around the rod. The resulting smooth curve has two components: a twist and a bend. Beginning at zero degrees at the latitudinal axis 38, the rear portion is twisted about the longitudinal axis of the body 10, the angle of rotation increasing toward the tail. In the illustrated embodiment, a transverse bend begins at a point 20 that is distant from the nose 12 by about 62% 24 of the total length of the body 10, and ends at a point 26 that is distant from the tail 14 by about 12% of the total length of the body 10 (so distant from the nose 12 by 88%), creating a bend 20-26 that is an arc segment subtending an angle 28 of about 38°.

FIGS. 4-6 illustrate the twist of this embodiment. FIGS. 4-5 are transverse cross-sections 40-40 taken at a distance of about 29% 36 of the total length of the body 10 from the tail 14 (i.e. 71% from the nose 12). At this cross-section 40-40, the angle of rotation of the twist about the longitudinal axis of this embodiment is about 5° 44. Referring to FIG. 6, the twist increases to an angle of rotation preferably in the range of 7.75° 46 at a cross-section 42-42 taken about 15% 34 of the total length of the body from the tail 14 (i.e. 85% from the nose 12).

Referring to FIG. 7, in this embodiment, the edges 48 are beveled to form a generally pointed V-shaped edge. The bevel allows the lure to cut through the air or water with less friction, providing an aerodynamic and hydrodynamic advantage when casting and trolling respectively. The points of the beveled edges 48 are slightly rounded to create smooth side edges that improve the rolling action and adhesion of paint: the points are rounded to about $1/34^{th}$ to $1/16^{th}$ inch (0.03 to 0.06 inch or 0.0762 to 0.1524 centimeters ("cm")) in width.

FIGS. 2, 3 and 7 are approximately full size on an 8.5 by 11 inch page, illustrating an embodiment with a widest part 30 of 0.725 inches (1.841 cm), a length of 4.875 inches (12.38 cm) measured along the curve (but only 4.658 inches or 1.8 cm 32 after bending, measured as the shortest distance between the nose 12 and tail 14), and a thickness 33 of 0.125 inches (⅛ inch or 0.318 cm). The widest part 30 of the body 10 is closer to the nose 12 than the tail 14, being about 1.88 inches (about 4.775 cm) or a distance of about 39% of the total length of the body from the nose 12. The pointed nose 12 and tail 14 are ground down until they measure about 0.125 inches (⅛ inch or 0.318 cm) across, then rounded slightly, for strength (not shown). Openings 16, 18 are 0.09 inches (3/32 inch or 0.229 cm) in diameter and their centers are located at a distance of 0.25 inches (¼ inch or 0.635 cm) from the rounded points of the nose 12 and tail 14, also for strength. The radius 35 of the arc segment defining the bend is about 1.8 inches (4.572 cm), and the bend 20-26 measures about 1.25 inches (3.175 cm) following the curve, so the bend is approximately a quarter (26%) of the total length of the body 10.

It is understood that this embodiment could be made in other sizes and the present invention is not limited to this embodiment. However, the latitudinal axis 38 will be at a distance from the nose 12 that is at least 45% of the total length of the body 10, the bend 20-26 will begin at a distance from the nose 12 that is in the range of 58% to 67% of the total length of the body 10, and extend towards the tail 14, subtending an angle 28 in the range of 32° to 44°. The twist will begin at the latitudinal axis, increasing to an angle 46 of rotation of between 5° and 8.5° at a distance 34 from the nose 12 that is 85% of the total length of the body 10.

In preferred embodiments, the latitudinal axis 38-38 is at a distance from the nose 12 that is in the range of 45 to 55% of the total length of the body 10 (more preferably 47 to 53%) and the twist 46 is in the range of 7° to 8.5°. The bend 20-26 encompasses 21 to 31% of the total length of the body 10 (more preferably 23 to 29%). The widest part of the body 10 is at a distance from the nose 12 that is 35 to 45% of the total length of the body 10 (more preferably 38 to 40%). The bend 20-26 begins at a distance from the nose 12 that is in the range of 60 to 64% of the total length of the body 10 and subtends an angle 28 in the range of 36° to 40°.

FIGS. 8-11 illustrate the fastening means and hook of this preferred embodiment, and FIG. 9, a tail 14 end elevational view, also shows the slight twist to the rear portion. The openings 16, 18 extend through the body 10 to accommodate attaching rings 50 and are countersunk (i.e. their edges recessed) to allow the rings 50 to slide freely through them, with less friction. Swivels 52 are preferably attached to each ring 50. Adjacent to the nose 12, a leader (often a heavy strand of fishing line (not shown)) is attached to one swivel 52; adjacent to the tail 14, a hook 54 is attached to the other swivel 52. However, the leader may also be tied directly to the ring 50 adjacent to the nose 12, eliminating one of the swivels 42. Some fishers prefer this arrangement for casting a light lure. The nominal size of a lure is rounded to the nearest half inch up to 4 inches (10.2 cm) and then rounded to the nearest inch. The embodiment illustrated is considered a five inch lure. The body 10 of a 5 inch (12.7 cm) lure is preferably balanced by hardware that is sized as follows. The rings 50 should form a circle $7/16^{th}$ inch (1.1 cm) in diameter from outside edge to outside edge, while the gauge of the metal of the rings 50 themselves is just over $1/32$ inch or 0.1 cm (0.03937 inch) in diameter. The swivels 52 should be size #3, and the hook 54 Mustad Ref. No. 9510XXXS size 4/0. The leader is preferably 30 to 40 pound test. The openings 16, 18 of the leader and hook fastening means are preferably two to three times the diameter (gauge) of the rings (here, three times), and are countersunk, so that the rings 50 slide smoothly through the openings 16, 18, reducing friction and improving the action of the lure.

In the versions of the illustrated embodiment that are about 2 to 3 inches (5.08 to 7.62 cm) in length (used mainly for fresh water fishing or early in the season in salt water), the rings 50, openings 16, 18, and swivels 52 would be sized down. For larger lures of 7 to 9 inches (17.8 to 22.86 cm) in length, the openings 16, 18, rings 50 and swivels 52 would be sized up to keep the lure in balance. Hook 54 size varies proportionately to each size of lure. The thickness 33 of the body 10 of the lure could preferably range from $1/16$ inch (0.159 cm) for a 2 inch (5.08 cm) lure to $3/16$ of an inch (0.476 cm) for the 7 to 9 inch (17.8 to 22.9 cm) lures.

The rings 50 and swivels 52 eliminate the need to thread the leader across the lure, minimizing the leader's interference with the action of the lure, and decreasing the likelihood of a game fish cutting the leader with its teeth and escaping, a solution to a disadvantage of the Early Jones Lures and some other prior art. Changing the fastening means required a complete redesign and rebalancing of the lure to re-create and improve on the self-perpetuating reverse roll action that was a feature of some of the Early Jones Lures.

"Reverse roll action" means the following. When the lure is pulled through the water, the twist causes the lure to roll x times in a first direction (where x equals 4 to 6), winding up the leader x times, storing mechanical potential energy. If the lure is pulled at a suitably slow speed, the tension imparted by the bend and the weight of the lure causes the leader to kick, then unwind (converting the potential energy into kinetic energy), then wind up x times in the opposite direction, so that the lure rolls 2x times in that opposite direction. This action is self-perpetuating because the twisted lure moving through the water provides its own torque or "push" to wind up the leader repeatedly, so that the lure settles into a pattern of 2x rolls in the first direction followed by 2x rolls in the opposite direction, the roll and reverse roll cycle taking about 8 to 10 seconds, in an action like that of an injured bait fish. Preferably the first direction the lure rolls is clockwise and the second or opposite direction is counter-clockwise. As the lure rolls, it also swims from side to side, because it kicks sideways just before it unwinds. The streamlined lure of this embodiment tends to swim three or four inches from side to side in calm water.

The roll, kick, reverse roll and swimming actions combine into a reverse roll action that has proven to be very attractive to game fish, and induces a reaction bite. The attraction is in part because the rolls cause distinctive vibrations and create a rounded silhouette when seen from below and behind. The kick and reverse rolls create more vibration and flash and make the simulated bait fish appear injured, and the rolls and swings make the action more lifelike. When the lure changes directions, the game fish believes its attractive prey is about to escape, which leads to the reaction bite. Furthermore, the tight rolls and predictability of the action increase the likelihood that, having lunged for the lure, the fish will actually capture it, compared to lures with more erratic action. And finally, alternating clockwise and counter-clockwise rolls unwind the leader as fast as it winds, so it will not tangle.

The more streamlined and smaller the lure, the tighter will be the roll. The diameter of the rolls of a 5 inch (12.7 cm) lure of the illustrated embodiment, with a length to width ratio preferably 6.7 to one, might average 3 inches (7.62 cm). The diameter of the rolls of a smaller version of the same embodiment would be less, and of a larger version a little more. Smaller versions of this embodiment have an action similar to the "bullet rolls" prized by those skilled in the art: tight rolls a few inches in diameter which have extra flash and vibration to attract game fish and are easier for the fish to zero in on and capture compared to more wide-ranging and erratic actions. The Early Jones Lures shaped to resemble herring had a length only about five times greater than the width, so the diameter of the rolls was greater, and the bends, twists, proportions and fastening means had not been perfected, so the rolls were less defined and the action was less fluid.

Another advantage of the tighter rotation and streamlined shape of this embodiment is that it catches fewer weeds.

Yet another advantage of the lure of the present invention is that, with its self-perpetuating action, no special casting technique or jigging is needed. All that is required is to troll or reel the lure through the water. The user will learn through trial and error the best trolling speed to obtain the optimum action, but there will generally be more action in salt than fresh water and the action will be even better if the lure is pulled against the tide or current of the water. The best mode of action is to use this lure with a leader attached to the fishing line with a swivel but no rings, and preferably the leader will be 32 inches (0.813 meters) when fishing for fast-moving fish such as Coho and Sockeye salmon, and 3 to 6 feet (0.9144 to 1.829 meters) when fishing for slower-moving fish like Spring salmon.

Another improvement is that the widest part 30 of the body 10 is closer to the nose 12 than the tail 14, so that the front portion of the body is heavier than the rear portion, moving the center of balance forward towards the nose compared to many lures of the prior art. The rings 50, swivels 52 and hook 54 are sized to balance the fishing lure as it moves through the water, so heavier rings 50, swivels 52 and hooks 54 can be used in counter-balance. The heavier hook means that larger fish can be caught on a given size of lure.

This embodiment is preferably made from Lexan®, a polycarbonate resin thermoplastic trade-marked by SABIC Innovative Plastics, which is used to make bulletproof glass. Lexan® is inexpensive, flexible and lightweight, yet strong, but other materials with similar properties could be used. The five inch lure of this embodiment is strong enough that the ring 50 should not break through the plastic when a person skilled in the art pulls in a 30 pound (13.61 kilograms) fish, and has sufficient flex to help keep the fish from shaking free. Lexan® that is 1/8 inch (0.3175 cm) or thicker will not lose its bend under normal use. A skilled fisher using a seven inch (17.8 cm) lure of the present invention made from 3/16 inch (0.4762 cm) thick Lexan®, with a proportionately larger hook 54, rounded ends and set-back openings can pull in at least a 50 to 60 pound (22.7 to 27.3 kilogram) fish, so the lure is suitable for commercial fishing. And since it is lightweight, it has a more fluid action in the water than heavier metal lures.

Yet another object of this invention is to provide a fishing lure which is suitable for both trolling and spin-casting in either fresh or salt water. Although embodiments of this invention made from plastic work better for trolling, they can also be used for spin-casting and with light spin-casting equipment can be cast about 50 feet (about 15.24 meters).

This embodiment will serve as a model for moulding the lure in large quantities, resulting in a mass-produced, inexpensive but high quality lure that is precisely shaped and balanced. The lure will preferably be packaged with the rings 50, swivels 52 and hook 54 required to balance the lure and result in the desired reverse roll action, and with instructions to pull slowly through the water, preferably against the tide or current for optimum action.

The lure of the present invention is shaped and decorated to look like a bait fish. Unlike the lures by Jones which resemble herring and which may have a length to width ratio of only about 5 to 1, the fact that the illustrated embodiment has a length 6.7 times its width (ratios of 6.2:1 to 7.0:1 or more preferably 6.5:1 to 6.9:1 in other embodiments), means it more nearly resembles a needlefish or other long slim bait fish such as juvenile trout. Although the drawings show no color or decoration, metallic tape preferably covers a substantial portion of the outer surface of the body 10 to reflect the light, and any surface not decorated with such tape is preferably colored (preferably by painting and clear-coating it) to resemble different bait fish and/or attract various game fish. Preferably reflective eyes are provided on each side, located adjacent to the nose, and curved lines (preferably red) are painted just posterior to the eyes to simulate the gill slits (the narrow exterior openings of the respiratory organs of a fish).

The present invention has been described with regard to preferred embodiments. However, it will be obvious to persons skilled in the art that a number of variations and modifications can be made without departing from the scope of the invention as described herein. The appended claims, properly construed, form the only limitation upon the scope of the invention.

I claim:

1. A fishing lure comprising:
   an elongated body having a total length, shaped like a finless fish, said body having tapered ends, a central longitudinal axis and a latitudinal axis perpendicular to the longitudinal axis, the body being symmetrical about the longitudinal axis and formed by
   a planar front portion having a generally pointed nose defining one of the tapered ends and extending from the nose to the latitudinal axis, said latitudinal axis being at a distance from the nose that is at least forty-five percent of the total length of the body;
   a rear portion beginning at the latitudinal axis and terminating in a generally pointed tail defining an other of the tapered ends, said rear portion having a curve characterized by
   a twist about the longitudinal axis, said twist beginning at the latitudinal axis and increasing from an angle of rotation of zero degrees at the latitudinal axis to an angle of rotation in the range of five to eight-and-a-half degrees at a distance from the nose that is eighty-five percent of the total length of the body, and
   a bend transverse in relation to the longitudinal axis, said bend subtending an angle in the range of thirty-two to forty-four degrees and characterized in that the bend begins at a distance from the nose that is in the range of fifty-eight to sixty-seven percent of the total length of the body and extends toward the tail;
   a hook fastening means centered on said longitudinal axis adjacent to the tail, said hook fastening means including
   a first attaching ring, and
   a first opening extending through the body to slidably accommodate said first attaching ring, and
   a first swivel slidably attached to the first attaching ring;
   a hook slidably attached to the first swivel;
   a leader fastening means centered on said longitudinal axis adjacent to the nose, said leader fastening means including
   a second attaching ring, and
   a second opening extending through the body to slidably accommodate said second attaching ring;
   a leader attached to the leader fastening means such that the leader draws the body through the water, whereby
   the leader is disposed away from the body and the hook such that a fish caught on the hook will not bite the leader,
   the hook trails the body,
   the twist causes the fishing lure to roll in a first direction, winding up the leader, and
   if the fishing lure is pulled through the water slowly, then the bend and the weight of the fishing lure cause the leader to unwind resulting in a reverse roll action that simulates the movements of an injured bait fish, inducing a game fish to strike the fishing lure in a reaction bite.

2. The fishing lure of claim 1 wherein the latitudinal axis is at a distance from the nose that is in the range of forty-five to fifty-five percent of the total length of the body.

3. The fishing lure of claim 1 wherein the leader fastening means includes a second swivel slidably attached to the second attachment ring and the leader is attached to said second swivel.

4. The fishing lure of claim 1 wherein the bend encompasses in the range of twenty-one to thirty-one percent of the total length of the body.

5. The fishing lure of claim 1 wherein a length to width ratio of the body is in the range of 6.2 to 7.0 to one, whereby the fishing lure is shaped to resemble a needlefish and the reverse roll action resembles bullet rolls.

6. The fishing lure of claim 1 wherein a widest part of the body is at a distance from the nose that is in the range of thirty-five to forty-five percent of the total length of the body such that the front portion is heavier than the rear portion, and the rings, swivels and hook are sized to counter-balance the weight of the front portion and balance the fishing lure as it moves through the water.

7. The fishing lure of claim 1 wherein:
   the latitudinal axis is at a distance from the nose that is in the range of forty-seven to fifty-three percent of the total length of the body,
   the twist has an angle of rotation in the range of seven to eight-and-a-half degrees at a distance from the nose that is eighty-five percent of the total length of the body,
   the bend begins at a distance from the nose that is in the range of sixty to sixty-four percent of the total length of the body and ends at a distance from the nose that is in the range of eighty-seven to eighty-nine percent of the total length of the body, said bend subtending an angle in the range of thirty-six to forty degrees, the widest part of the body is at a distance from the nose that is in the range of thirty-eight to forty percent of the total length of the body, said body having a length to width ratio in the range of 6.5 to 6.9 to one.

8. The fishing lure of claim 1 wherein the first and second openings each further comprise a center and wherein the center of the first opening is located at a distance from the tail that is one-quarter of an inch (0.635 centimeters) and the center of the second opening is located at a distance from the nose that is one-quarter of an inch (0.635 centimeters).

9. The fishing lure of claim 1 wherein the first and second openings each have a diameter which is in the range of two to three times greater than the diameter of the rings, whereby the rings slide easily through said openings, friction is reduced, and the rolls are improved.

10. The fishing lure of claim 1 wherein the first and second openings are countersunk whereby the first and second attaching rings slide more easily through said first and second openings, friction is reduced and the rolls are improved.

11. The fishing lure of claim 1 wherein the elongated body further comprises beveled edges which impart an aerodynamic and hydrodynamic advantage to the fishing lure.

12. The fishing lure of claim 11 wherein the beveled edges form a generally pointed V-shape, whereby the action of the fishing lure is fluid and paint adheres to the edge.

13. The fishing lure of claim 1 wherein the body is formed of a non-corrosive material.

14. The fishing lure of claim 1 wherein the body is formed of polycarbonate resin thermoplastic.

15. The fishing lure of claim 1 wherein the body has a first lateral surface and a second lateral surface and the first and second openings extend from the first lateral surface to the second lateral surface and are at right angles to said first and second lateral surfaces.

16. The fishing lure of claim 1 wherein the body is decorated with at least one of the following: at least one color, a sheet of metallic reflective tape covering a substantial portion of at least one lateral surface of the body, a reflective eye located on at least one lateral surface of the body adjacent to the nose, and a curved line representing a gill slit painted posterior to each eye, or any combination thereof.

17. A fishing lure comprising:

an elongated body formed of polycarbonate resin thermoplastic having a total length, shaped like a finless fish, said body having tapered ends, a central longitudinal axis and a latitudinal axis perpendicular to the longitudinal axis, a first lateral surface and a second lateral surface, said body being symmetrical about the longitudinal axis and formed by a planar front portion having a generally pointed nose defining one of the tapered ends and extending from the nose to the latitudinal axis, said latitudinal axis being at a distance from the nose that is in the range of forty-seven to fifty-three percent of the total length of the body;

a rear portion beginning at the latitudinal axis and terminating in a generally pointed tail defining an other of the tapered ends, said rear portion having a curve characterized by a twist about the longitudinal axis, said twist beginning at the latitudinal axis and increasing from an angle of rotation of zero degrees at the latitudinal axis to an angle of rotation in the range of seven to eight-and-a-half degrees at a distance from the nose that is eighty-five percent of the total length of the body, and a bend transverse in relation to the longitudinal axis, said bend subtending an angle in the range of thirty-six to forty degrees and characterized in that the bend begins at a distance from the nose that is in the range of sixty to sixty-four percent of the total length of the body and extends towards the tail;

a widest part of the body at a distance from the nose that is in the range of thirty-seven to forty-one percent of the total length of the body, a length in the range of two inches to nine inches (5.08 to 22.86 centimeters), a thickness in the range of one-sixteenth to three-sixteenth of an inch (0.1588 to 0.4762 centimeters), a length to width ratio in the range of 6.5 to seven to one, a leader fastening means centered on said longitudinal axis adjacent to the nose and a hook fastening means centered on said longitudinal axis adjacent to the tail, said leader fastening means and said hook fastening means each including an attaching ring, an opening extending from the first lateral surface to the second lateral surface and oriented at right angles to said first and second lateral surfaces, said opening slidably accommodating said ring, and a swivel slidably attached to said ring;

a hook slidably attached to the swivel adjacent to the tail; and a leader attached to the swivel adjacent to the nose such that the leader draws the body through the water, whereby the leader is disposed away from the body and the hook such that a fish caught on the hook will not bite the leader, the hook trails the body, the twist causes the fishing lure to roll in a first direction, winding up the leader, and if the fishing lure is pulled through the water slowly, then the bend and the weight of the fishing lure cause the leader to unwind resulting in a reverse roll action that simulates the movements of an injured bait fish, inducing a game fish to strike the fishing lure in a reaction bite.

18. The fishing lure of claim 17 wherein the openings each have a diameter which is in the range of two to three times greater than the diameter of the rings and the openings are countersunk such that the rings slide easily through said openings, friction is reduced, and the rolls are improved.

19. The fishing lure of claim 17 wherein the elongated body further comprises beveled edges which impart an aerodynamic and hydrodynamic advantage to the fishing lure.

20. The fishing lure of claim 17 wherein the body is decorated with at least one of the following: at least one color, a sheet of metallic reflective tape covering a substantial portion of at least one of the first and second lateral surfaces, a reflective eye located on at least one of the first and second lateral surfaces adjacent to the nose, and a curved line representing a gill slit painted posterior to each eye, or any combination thereof.

* * * * *